United States Patent
Xi et al.

(10) Patent No.: US 9,495,439 B2
(45) Date of Patent: Nov. 15, 2016

(54) ORGANIZING MULTIMEDIA CONTENT

(71) Applicant: Cisco Technology, Inc., San Jose, CA (US)

(72) Inventors: Yongxin Xi, San Jose, CA (US); Mainak Sen, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 374 days.

(21) Appl. No.: 14/048,801

(22) Filed: Oct. 8, 2013

(65) Prior Publication Data
US 2015/0100583 A1  Apr. 9, 2015

(51) Int. Cl.
*G06F 17/30* (2006.01)

(52) U.S. Cl.
CPC ... *G06F 17/30598* (2013.01); *G06F 17/30023* (2013.01); *G06F 17/30784* (2013.01)

(58) Field of Classification Search
CPC .................. G06F 17/30023; G06F 17/30598; G06F 17/30784
See application file for complete search history.

(56) References Cited

U.S. PATENT DOCUMENTS

| | | | | |
|---|---|---|---|---|
| 7,246,314 B2* | 7/2007 | Foote | ................. | G06F 17/30814 707/E17.028 |
| 7,298,930 B1* | 11/2007 | Erol | ................... | G06K 9/00711 382/305 |
| 7,640,272 B2* | 12/2009 | Mahajan | ........... | G06F 17/30787 707/999.104 |
| 8,392,183 B2* | 3/2013 | Weber | .................. | G11B 27/034 700/94 |
| 8,433,136 B2* | 4/2013 | Epshtein | ........... | G06F 17/30796 382/168 |
| 2004/0163034 A1* | 8/2004 | Colbath | .................. | G10L 15/28 715/230 |
| 2009/0234721 A1* | 9/2009 | Bigelow | ................ | G06Q 10/10 705/12 |
| 2012/0323575 A1* | 12/2012 | Gibbon | .................. | G11B 27/28 704/246 |
| 2013/0191452 A1* | 7/2013 | Beerse | ................... | G06Q 10/00 709/204 |
| 2013/0325972 A1* | 12/2013 | Boston | ............... | G06K 9/00751 709/206 |
| 2014/0172419 A1* | 6/2014 | John | ................. | G06F 17/30746 704/201 |
| 2014/0278405 A1* | 9/2014 | Peters | ................. | G10L 15/1822 704/235 |

OTHER PUBLICATIONS

Cisco, "15-Minute Guide to Pulse Video Analytics", Jun. 2012, 4 pages.*

* cited by examiner

*Primary Examiner* — Scott A Waldron
(74) *Attorney, Agent, or Firm* — Patterson + Sheridan LLP (57) ABSTRACT

In one embodiment, a method includes receiving digital media content files. The digital media content has at least one property associated with it. Topically related segments are determined from received content in accordance with one or more property. Topic clusters are generated based on similarities between segments. Topic clusters are compared and clustered from multiple files of the plurality into cluster groups in accordance with a comparison. Cluster groups are associatively stored in a data storage. A search for topic clusters relevant to a particular need is made, and a series of related segments associated with the search are generated for serial display.

15 Claims, 6 Drawing Sheets

ORGANIZING MULTIMEDIA CONTENT

TECHNICAL FIELD

The present disclosure relates generally to retrieval of multimedia content of interest to a particular situation.

BACKGROUND

Digital content includes pictures, audio, video, text-based information, or combinations of two or more types. Devices for capturing or generating digital content are becoming extremely capable and less expensive due to continuing improvements in technology. These factors lead to capturing, storing or distribution of mass quantities of digital content in a growing number of areas.

It may be difficult to identify which stored digital content may be of interest in any particular situation, or to a particular user or users.

BRIEF DESCRIPTION OF THE DRAWINGS

The accompanying drawings incorporated herein and forming a part of the specification illustrate the example embodiments.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, a system and method includes receiving digital media content files. The digital media content has at least one property associated with it. Topically related segments are determined from received content in accordance with one or more property. Topic clusters are generated based on similarities between segments. Topic clusters are compared and clustered from multiple files of the plurality into cluster groups in accordance with a comparison. Cluster groups are associatively stored in a data storage. In a further refinement of this example embodiment, a search for topic clusters relevant to a particular need is made, and a series of related segments associated with the search are generated for serial display.

In accordance with another example embodiment, received digital multimedia content is segregated into a plurality of topically related segments in accordance with at least one associated property. A plurality related topic clusters are generated in accordance with similarities between segments. User identification data is received and used to retrieve a subset of the related topic clusters. Received user topic data is used to select at least one cluster of the subset. At least one of the plurality of related topic clusters is retrieved in accordance with received user topic A display is generated as a sequence of multimedia content associated with the related topic clusters.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Video or other multimedia content such as voice recordings may be obtained regularly by enterprises. By way of example, corporations may make recordings of sales meetings, department meetings, management meetings or training sessions.

Recorded content, such as recorded meetings, presentations, seminars or other content are often stored and made available for search and retrieve through a portal, such as a work station, terminal, tablet, smart phone or other digital device. One way to search for content, such as videos, is to be directed to most viewed, most recently accessed or generated, or content isolated via keyword or tag searching. In some more advanced cases, like the Cisco Pulse system of Cisco Systems, Inc., 170 West Tasman Dr., San Jose, Calif. 95134, USA, videos can be searched through spoken keywords, topics, speakers or other suitable criteria. These methods are useful for isolating a single video or other digital content piece, while further benefits are gained by capturing the relationship among multiple content pieces, such as multiple videos or multiple relevant segments within one or more videos that share the same topic.

By way of example, a situation for a "go to market" strategy for Cisco Pulse is being discussed by an associated marketing team. In the example, the marketing team may have three agenda items in their first meeting:

Upcoming action items from the team;
Timeline for product delivery; and
Go to market strategy kick off.

In the subject example, the team may decide to reconvene for another meeting to follow up on the market research they did regarding their earlier, go to market strategy session. This time they have only two agenda items:

Competition from Microsoft; and
Go to market strategy research results.

Continuing the subject example, in a third and final meeting, the marketing team wants approval from an associated vice president, general manager, and engineering director. Accordingly, a final meeting is called as a third meeting wherein the team presents their findings with the following agenda:

Discuss the fiscal cliff and how that might affect hiring; and
Go to market concrete plans.

In the subject example, all three meetings were video-recorded and each associated recording is uploaded to a video portal. Later, a user, such as a new executive, or any other individual or group, desires to secure an understanding of the Cisco Pulses go to market strategy. When a user searches the portal, the user will likely retrieve data corresponding to many videos. The three above-mentioned videos may belong to a resultant video collection, but likely scattered in random order with several or many other videos or other media files. The user is now tasked to figure out where the three targeted videos may be found. The user must then secure an understanding of a interrelation between these three videos. Finally, the user suitably looks for "go to market" portions of these videos to understand the entire, relevant It is desirable for the user to get one coherent view as to "how" the go to market strategy evolved to its current state. This is addressed by provision of an evolvement of one or more group-specific topics by automatically mining videos over a time period affording a user an improved experience in quickly searching and understanding the topic.

Figure 1:
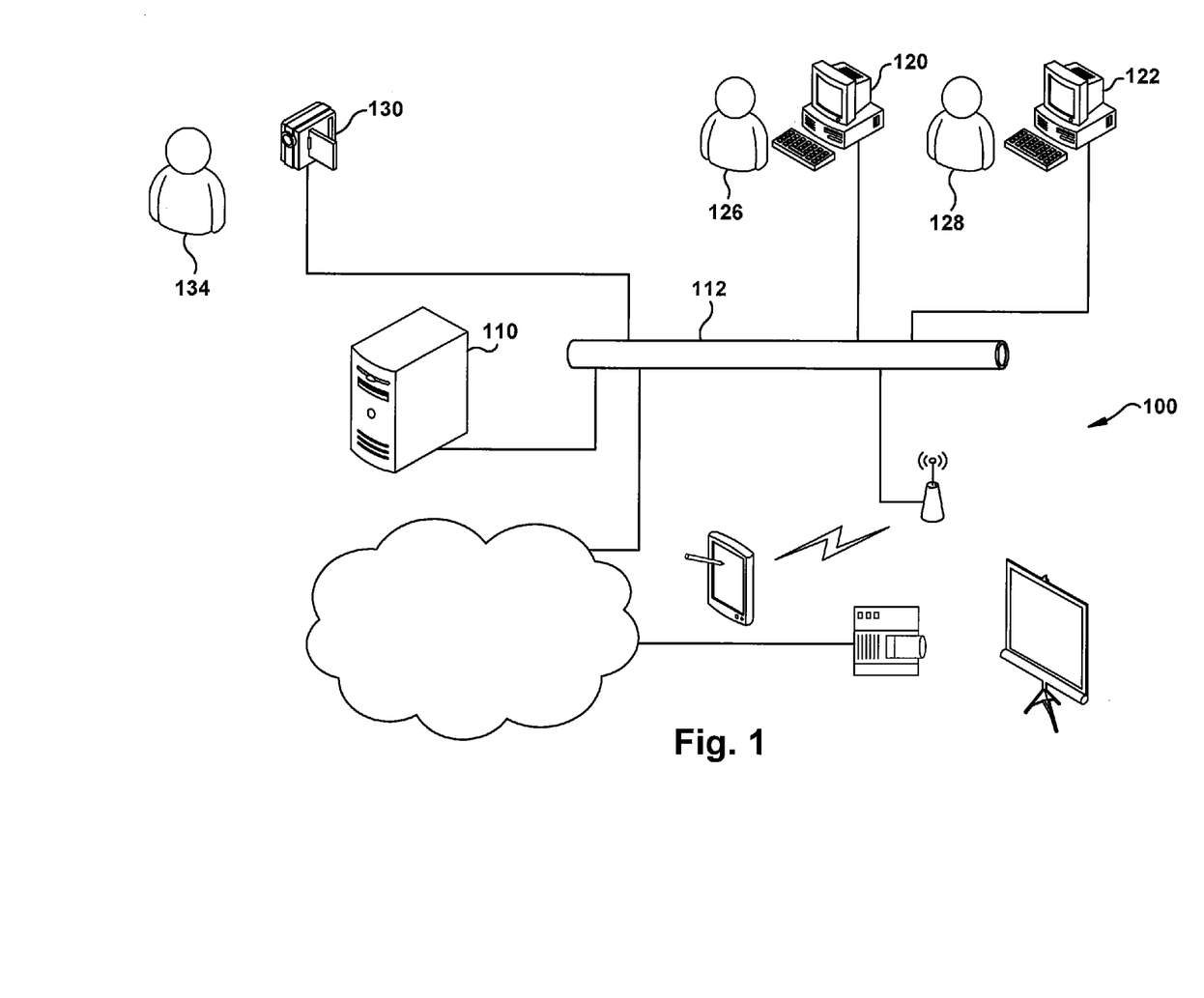
FIG. 1 is block diagram illustrating an example of system for receiving, processing and outputting digital content.

In accordance with the forgoing and turning now to FIG. 1, illustrated is an example embodiment of a system 100. The system 100 includes one or more computers, such as server 110 that is in data communication with a network 112. In the illustrated example, also in data communication with network 112 are one or more data devices, such as computers 120 and 122, suitably associated with one or more users such as illustrated at 126 and 128. Also illustrated in data communication with network 112 is one or more media capture devices, such as an audio/visual capture device or camera 130, suitably associated with an individual or group, or for capture or transmission of prepared content. By way of example in the figure, camera 130 is targeted to a human presenter 134.

Figure 2:
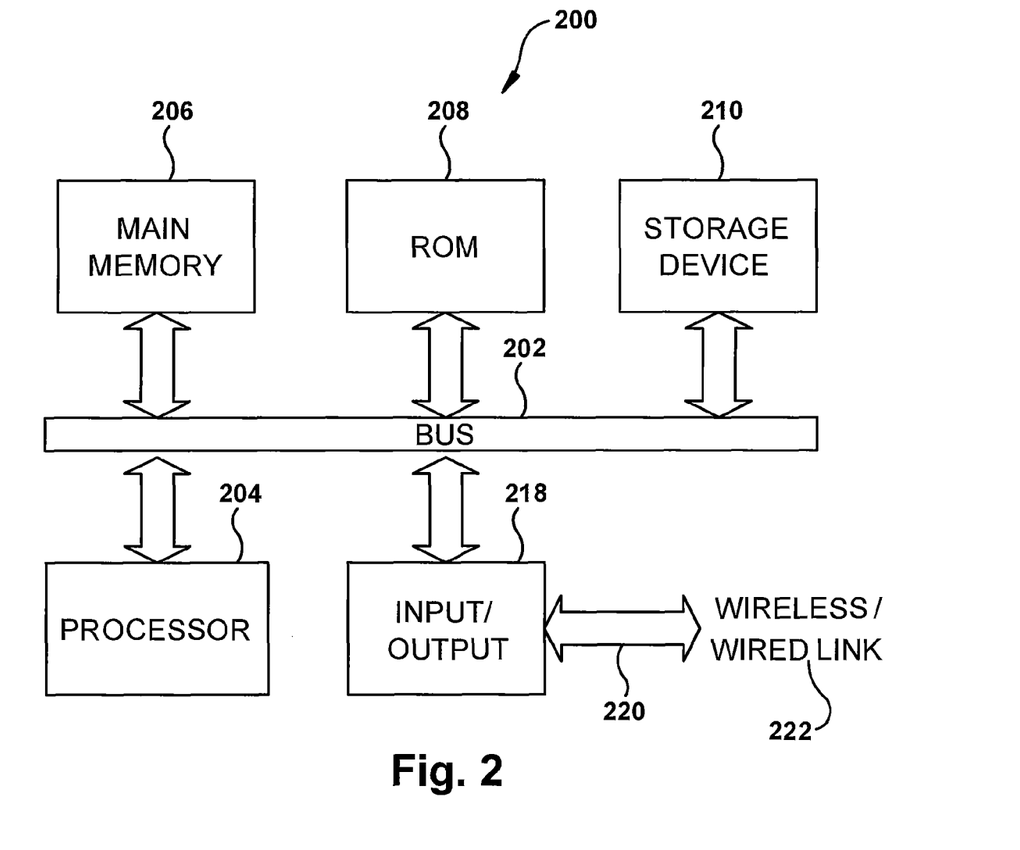
FIG. 2 is an example of a computer system upon which an example embodiment can be implemented.

FIG. 2 is a block diagram illustrating an example of a suitable computer system 200 for use as one or more servers, such as that used in connection with server 110 of FIG. 1. Computer system 200 includes a bus 202 or other communication mechanism for communicating information and a processor 204 coupled with bus 202 for processing information. Computer system 200 also includes a main memory 206, such as random access memory (RAM) or other dynamic storage device coupled to bus 202 for storing information and instructions to be executed by processor 204. Main memory 206 also may be used for storing temporary variable or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk, optical disk, and/or flash storage, is provided and coupled to bus 202 for storing information and instructions. An input/output interface 212 facilitates via keyboard, mouse, network interface, or any other device outside of the system 200.

According to an example embodiment, a suitable platform for computer system 200 includes a processor 204 executing one or more sequences of one or more instructions contained in main memory 206. Such instructions may be read into main memory 206 from another computer-readable medium, such as storage device 210. Execution of the sequence of instructions contained in main memory 206 causes processor 204 to perform the process steps described herein. One or more processors in a multi-processing arrangement may also be employed to execute the sequences of instructions contained in main memory 206. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 204 for execution. Such a medium may take many forms, including but not limited to non-volatile media, and volatile media. Non-volatile media include, for example, optical or magnetic disks, such as storage device 210. Volatile media include dynamic memory such as main memory 206. As used herein, tangible media may include volatile and non-volatile media. Common forms of computer-readable media include, for example, floppy disk, a flexible disk, hard disk, magnetic cards, paper tape, any other physical medium with patterns of holes, a RAM, a PROM, an EPROM, a FLASH PROM, CD, DVD or any other memory chip or cartridge, or any other medium from which a computer can read.

Input/output interface 218 provides a two-way data communication coupling computer system 200 to a network link 220 that is connected to a local network 222. For example, input/output interface 218 may be a local area network (LAN) card to provide a data communication connection to a compatible LAN. As another example, input/output interface 218 may be an integrated services digital (ISDN) card or a modem to provide a data communication connection to a corresponding type of telephone line. Wireless links may also be implemented. In any such implementation, input/output interface 218 sends and receives electrical, electromagnetic, or optical signals that carry digital data streams representing various types of information.

Network link 220 typically provides data communication through one or more networks to other data devices. For example, network link 220 may provide a connection through an associated wide-area or local network.

Figure 3:
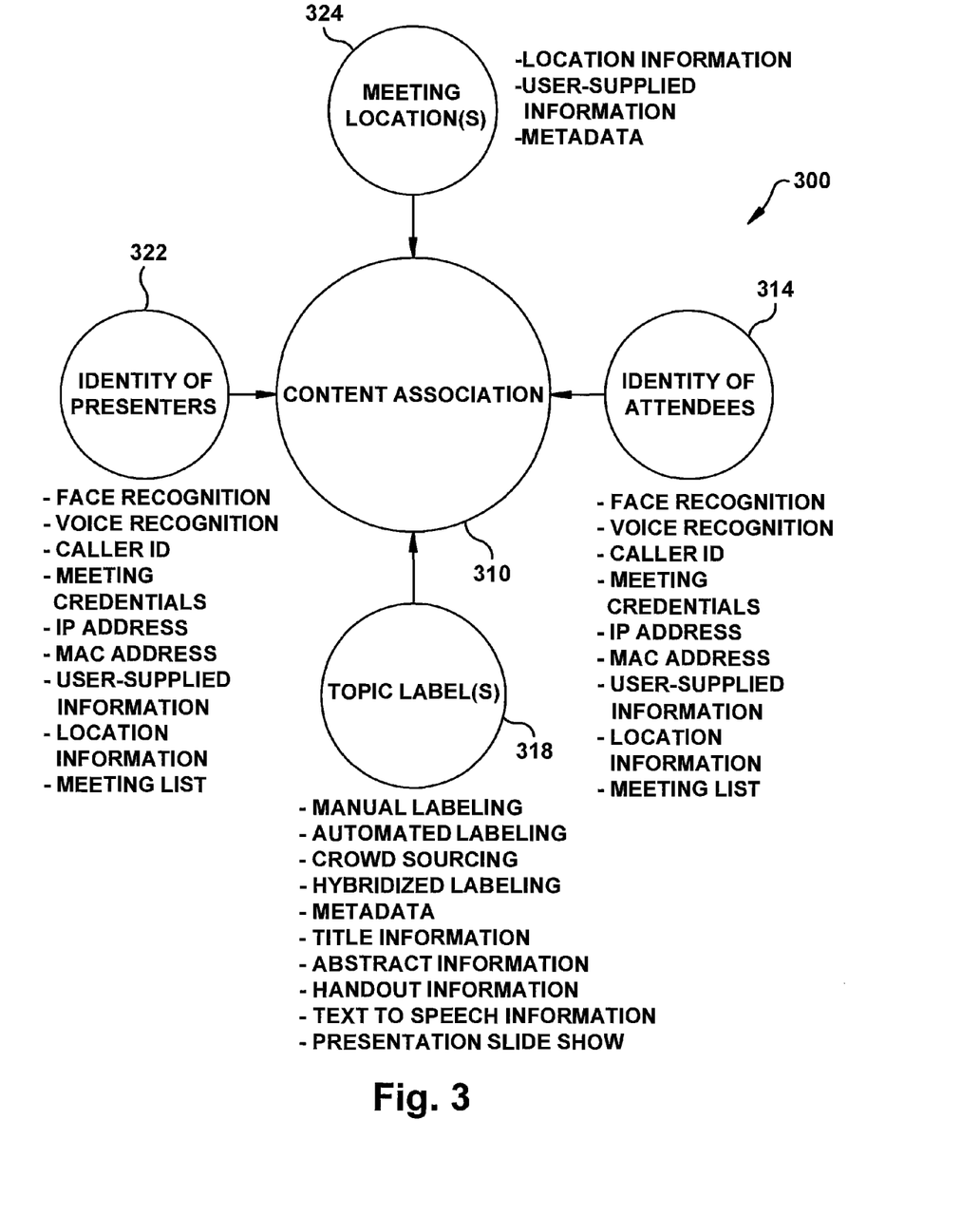
FIG. 3 is a block diagram of an example of content association.

Turning now to FIG. 3, illustrated is an example embodiment of a content association system 300. Digital content, such as the example content noted above, is suitably associated with tags, summary data, key word data, labels or metadata to aid in future organization, storage, search or retrieval. In the illustrated example of FIG. 3, association of content, such as digital multimedia content files occurs at 310. Such association is suitably accomplished by either manual, automated or hybridized tagging or flagging. Suitable association includes data or metadata such as that associated with or relating to identity of attendees 314. Example data for association with attendee identity includes identification through face recognition, voice recognition, caller ID, meeting credentials, IP address, MAC address, user-supplied information or an associated meeting list.

Suitable content association is relative to topic labels at 318. Example topic labels include manually-supplied labels, automatedly supplied labels, crowd-sourced labels, metadata, title information, abstraction information, handout information, text-to-speech information, or information supplied by handouts or presentation materials such as a slide show.

Suitable content association is associated with identity of a presenter or presenters at 322, which identification is suitably made analogously to that noted in connection with attendees 314, above. Suitable content association is also made with one or more meeting location at 324. Example location information is achieved by any suitable automated, manual or hybridized location system, such as GPS IP address information, cellular tower information, PBX exchange information or the like. In another example, location information is suitably inferred relative to a spoken language analysis or time-of-day analysis insofar as meetings may occur in various time zones and may therefore be associated with business hours, waking hours, or the like.

Figure 4:
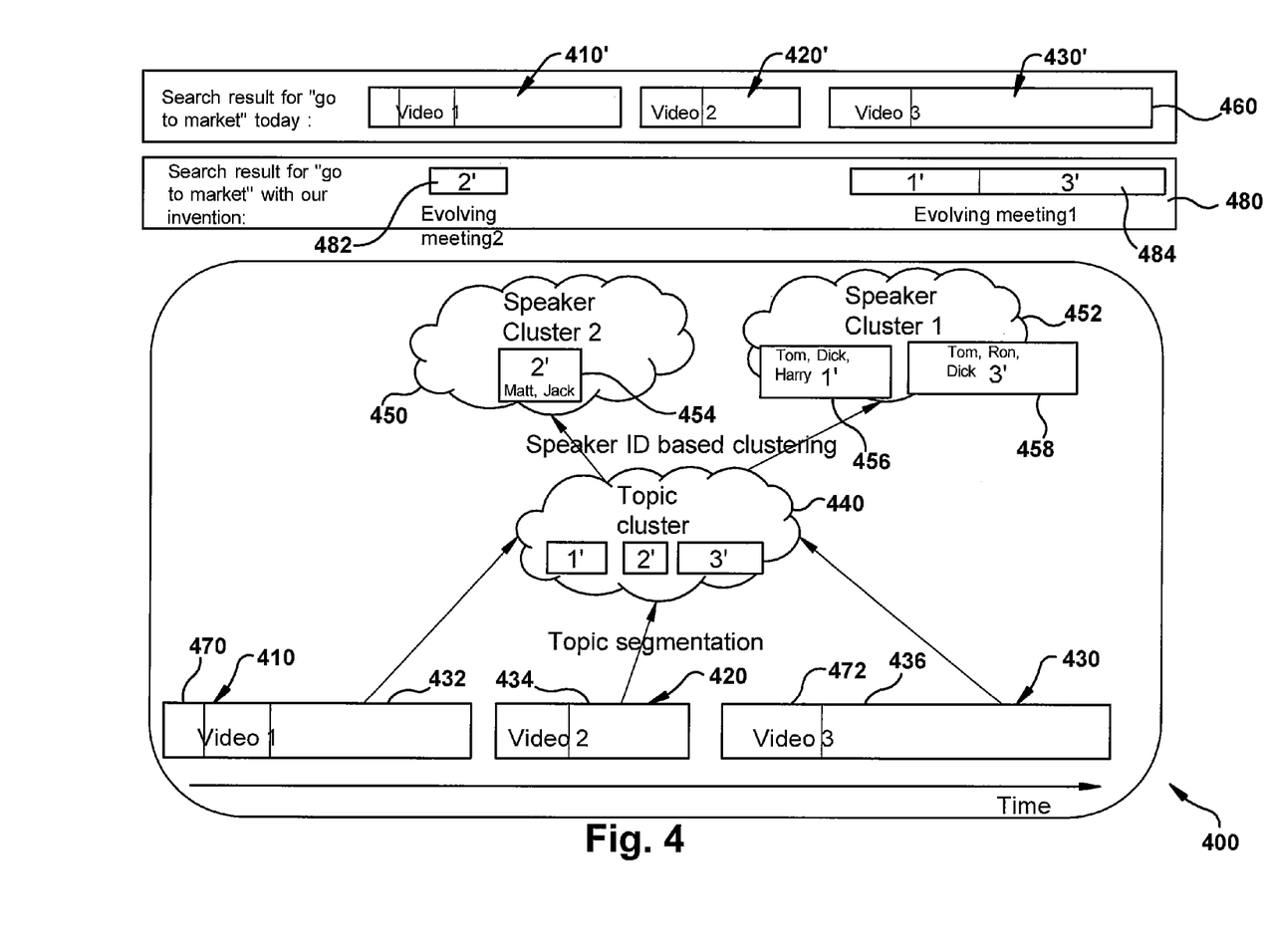
FIG. 4 is a diagram of an example for organizing video content.

FIG. 4 is an illustration of example 400 of organization of corporate videos into evolving time series. In the illustrated example, topic content and meeting participant information is used to track meeting topic "go to market" as noted in the example above. Three video sessions are represented at 410, 420 and 430. Segments 432, 434 and 436 illustrate go-to-market segments corresponding to videos 410, 420 and 430 respectively. These segments are suitably grouped into topic cluster 440, and further divided into different speaker clusters 450 and 452. In the illustrated example, speaker cluster 450 is associated with speakers Matt and Jack at 454, while speaker cluster 452 is associated with Tom, Dick and Harry at 456 and with Tom, Ron and Dick at 458. When a user searches for "go to market" with a key person or group name, the system enables the user to fully understand the evolvement of the "go to market" topic discussed in that particular group. Illustrated at 460 is an example of an output associated with a search for "go to market." Since all videos in the example include such a topic segment, all are reflected 460, and are denoted as 410', 420' and 430'.

By way of further example in FIG. 4, video 410 and video 430 include segments associated with "my invention" at 470 and 472, respectively. 480 represents an example result when a query is made for both "go to market" and "my invention." When the earlier-noted search for "go to market" is further refined to include "my invention," 480 illustrates further evolution of content of interest, along with formatting for presentation or display. The results illustrated at 480 include segments of the videos which satisfy both search criteria, include segments 470 and 472 associated with an evolving meeting. Segment 482 is associated with video 420/420', and is associated with "go to market" but not with "my invention." Segments 484 include both, and are therefore advantageously associated with one By way of further example, a user would then commence a playback or display of segments of 480. Related segments are suitably played in a serialized arrangement, such as in an order corresponding to time, place or other feature associated with recording or capture. Thus, related segments are suitably "stitched" together such as illustrated at 484, while other, semi-related segments from search results are associated as noted with 482.

Figure 5:
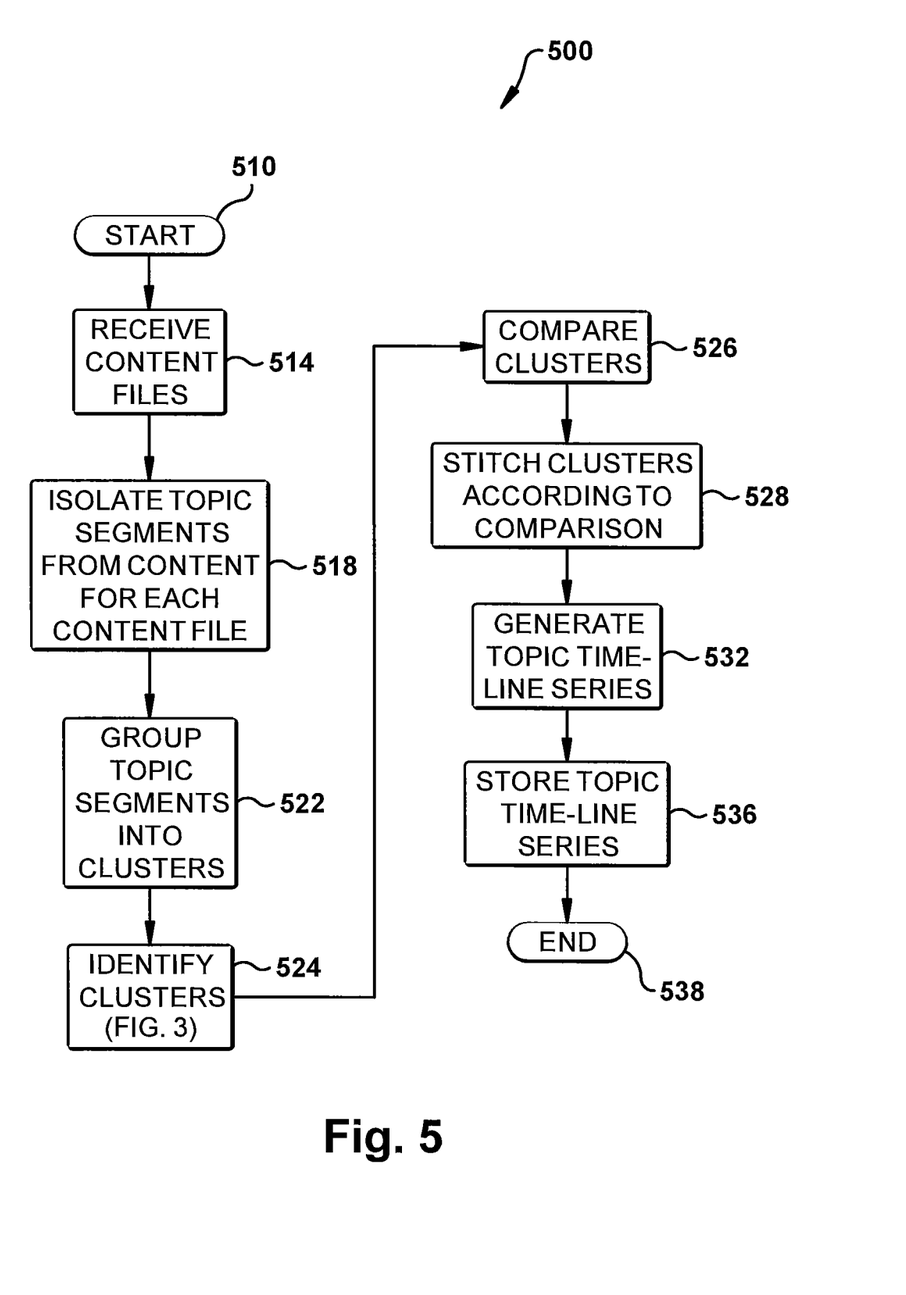
FIG. 5 is a flowchart of an example embodiment for content preparation.

Turning now to FIG. 5, illustrated is an example embodiment 500 for accomplishing the forgoing. The process starts a 510 and content is received at 514. Topic segments are isolated from content of each received file in accordance with criteria or content type as noted above at 518. Next, at 522, topic segments are grouped into clusters which include one or more related topic segments. Clusters are identified at 524, including by way of further example criteria as illustrated in FIG. 3. Next, clusters are compared at 526 and related clusters are stitched together a as a result of such comparison. It will be appreciated that such clustering or stitching is suitably accomplished in accordance with pre-selected criteria or parameters, or completed on-the-fly in accordance with received queries, and such an ordering is illustrated at 528. Next, a time line series is generated at 532 in accordance with a specified temporal relationship between segments or segment clusters. These results are stored at 536 for future retrieval, and the process suitably ends at 538.

Figure 6:
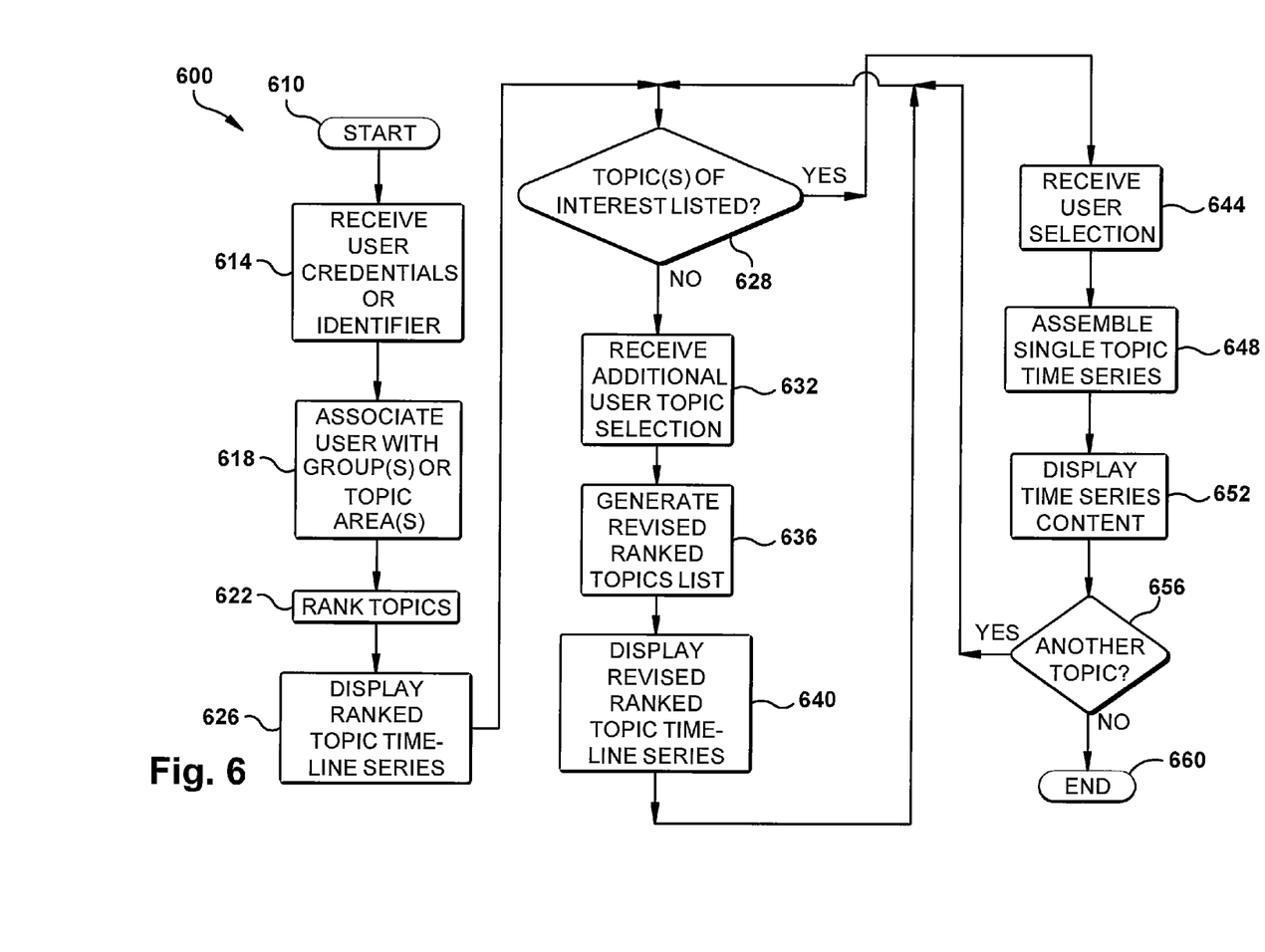
FIG. 6 is a flowchart of an example embodiment of selection and generation of a topic time-series.

Turning now to FIG. 6, illustrated is an example embodiment 600 for retrieving relevant or desired content from multiple files, such as from multiple media files. The process commences at 610, and a requesting user suitably logs in with the user's credentials or any other suitable identifier at 614. It will be appreciated that such a login is not required, but advantageously provides additional information at the outset so as to allow for a filtering of potentially relevant topics, segments or clusters for more efficient display and selection at 618. This feature is particularly advantageous when a large volume of content is available, and much of it may not be relevant to a particular user or class of users. By way of further example, a user in a marketing department of an enterprise is more likely to want to see marketing or sales related content, as opposed to content associated with product manufacturing or supplier-related information. If that person logs in, an initial filtering of content options to be displayed would suitably include listings of marketing or sales related videos.

Next, at 622, topics are suitably ranked relative to anticipated relevance, and the results are displayed or otherwise output in a ranked order at 626. Next, at 628 a user suitably provides input as to whether a topic or topics of interest are illustrated in the ranked list. If not, additional user topic selection is received at 632. A revised, ranked list is generated at 636 and this revised list is displayed or otherwise output at 640, and a return to 626 allows for further selection or refinement.

Once a topic or topics is determined to be available at 628, a selection therefrom is received at 644. The selection facilitates assembly of content or segments, suitably in a time line series, at 648 for display or other output at 652. If another topic is selected at 656, the process suitably returns to listing and refinement at 628 in a manner detailed above. If no further topics are desired, the process suitably terminates at 660.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. A method comprising:
receiving a plurality of video recordings, wherein each of the video recordings comprise a recording of a respective meeting of a plurality of meetings, wherein the video recordings are stored as digital media content files;
identifying a set of properties of the video recordings, wherein the set of properties of each respective video recording comprises: (i) a presenter at the respective meeting, (ii) an attendee at the respective meeting, (iii) a topic of the respective meeting, and (iv) a time the respective meeting occurred;
associating at least two topically related segments of at least two of the plurality of video recordings based on the respective sets of properties;
generating topic clusters based on similarities between the at least two topically related segments, wherein the topic clusters comprise the at least two topically related segments of the at least two of the plurality of video recordings;
generating speaker clusters based on the topic clusters, wherein the speaker clusters associate the presenters at each of the meetings corresponding to the at least two topically related segments of the at least two of the plurality of video recordings;
comparing the topic clusters based on the set of properties of each video recording;
associating the topic clusters from the at least two of the plurality of video recordings into cluster groups based on the comparing of the topic clusters;
associatively storing the cluster groups in a data storage; and
generating a time line series corresponding to the at least two topically related segments in each cluster group.

2. The method of claim 1, further comprising:
storing each time line series associatively with each corresponding topically related segment in the data storage.

3. The method of claim 2, further comprising:
receiving query data specifying at least one of a topic and a speaker; and
retrieving at least one of a topic cluster and a speaker cluster from the data storage based on the received query data.

4. The method of claim 3, further comprising:
displaying the at least one cluster group on an associated display in a display sequence corresponding to the time line series associated therewith.

5. The method of claim 2, further comprising:
receiving query data; and
associating topically homogeneous segments in accordance with the received query data.

6. A non-transitory computer-readable storage medium storing instructions, which when executed by a processor, performs an operation comprising:
receiving a plurality of video recordings, wherein each of the video recordings comprise a recording of a respective meeting of a plurality of meetings, wherein the video recordings are stored as digital media content files;
identifying a set of properties of the video recordings, wherein the set of properties of each respective video recording comprises: (i) a presenter at the respective meeting, (ii) an attendee at the respective meeting, (iii) a topic of the respective meeting, and (iv) a time the respective meeting occurred;
associating at least two topically related segments of at least two of the plurality of video recordings based on the respective sets of properties;
generating topic clusters based on similarities between the at least two topically related segments, wherein the topic clusters comprise the at least two topically related segments of the at least two of the plurality of video recordings;
generating speaker clusters based on the topic clusters, wherein the speaker clusters associate the presenters at each of the meetings corresponding to the at least two topically related segments of the at least two of the plurality of video recordings;
comparing the topic clusters based on the set of properties of each video recording;
associating the topic clusters from the at least two of the plurality of video recordings into cluster groups based on the comparing of the topic clusters;
associatively storing the cluster groups in a data storage; and
generating a time line series corresponding to the at least two topically related segments in each cluster group.

7. The non-transitory computer-readable storage medium of claim 6, the operation further comprising:
storing each time line series associatively with each corresponding topically related segment in the data storage.

8. The non-transitory computer-readable storage medium of claim 7, the operation further comprising:
receiving a query specifying a first topic and a first speaker;
retrieving at least one cluster group based on the set of properties of the at least one cluster group matching the first topic;
retrieving a first speaker group based on the presenter of the first speaker group matching the first speaker; and
returning the at least one cluster group and the first speaker group as responsive to the query.

9. The non-transitory computer-readable storage medium of claim 8, the operation further comprising:
displaying the at least one cluster group on an associated display in a sequence corresponding to the time line series.

10. The non-transitory computer-readable storage medium of claim 7, the operation further comprising:
receiving a query; and
associating topically homogeneous segments in accordance with the query.

11. A system, comprising:
one or more computer processors; and
a memory containing a program, which when executed by the processors, performs an operation comprising:
receiving a plurality of video recordings, wherein each of the video recordings comprise a recording of a respective meeting of a plurality of meetings, wherein the video recordings are stored as digital media content files;
identifying a set of properties of the video recordings, wherein the set of properties of each respective video recording comprises: (i) a presenter at the respective meeting, (ii) an attendee at the respective meeting, (iii) a topic of the respective meeting, and (iv) a time the respective meeting occurred;
associating at least two topically related segments of at least two of the plurality of video recordings based on the respective sets of properties;
generating topic clusters based on similarities between the at least two topically related segments, wherein the topic clusters comprise the at least two topically related segments of the at least two of the plurality of video recordings;
generating speaker clusters based on the topic clusters, wherein the speaker clusters associate the presenters at each of the meetings corresponding to the at least two topically related segments of the at least two of the plurality of video recordings;
comparing the topic clusters based on the set of properties of each video recording;
associating the topic clusters from the at least two of the plurality of video recordings into cluster groups based on the comparing of the topic clusters;
associatively storing the cluster groups in a data storage; and
generating a time line series corresponding to the at least two topically related segments in each cluster group.

12. The system of claim 11, the operation further comprising:
storing each time line series associatively with each corresponding topically related segment in the data storage.

13. The system of claim 12, the operation further comprising:
- receiving a query specifying a first topic and a first speaker;
- retrieving at least one cluster group based on the set of properties of the at least one cluster group matching the first topic;
- retrieving a first speaker group based on the presenter of the first speaker group matching the first speaker; and
- returning the at least one cluster group and the first speaker group as responsive to the query.

14. The system of claim 13, the operation further comprising:
- displaying the at least one cluster group on an associated display in a sequence corresponding to the time line series.

15. The system of claim 12, the operation further comprising:
- receiving a query; and
- associating topically homogeneous segments in accordance with the query.

\* \* \* \* \*